US008595209B1

(12) United States Patent
Kraybill (10) Patent No.: US 8,595,209 B1
(45) Date of Patent: Nov. 26, 2013

(54) PRODUCT IDEA SHARING ALGORITHM

(75) Inventor: Jeremy Kraybill, Austin, TX (US)

(73) Assignee: Boundless Network, Inc., Austin, TX (US)

( * ) Notice: Subject to any disclaimer, the term of this patent is extended or adjusted under 35 U.S.C. 154(b) by 737 days.

(21) Appl. No.: 12/021,694

(22) Filed: Jan. 29, 2008

(51) Int. Cl.
G06F 17/30 (2006.01)

(52) U.S. Cl.
USPC .................. 707/708; 707/721; 707/750

(58) Field of Classification Search
USPC .......................... 707/750, 721, 708
See application file for complete search history.

(56) References Cited

U.S. PATENT DOCUMENTS

| 6,182,068 | B1 * | 1/2001 | Culliss .................. 707/721 |
| 6,876,997 | B1 * | 4/2005 | Rorex et al. .............. 1/1 |
| 7,412,442 | B1 * | 8/2008 | Vadon et al. ............. 1/1 |
| 7,430,561 | B2 * | 9/2008 | Bailey et al. ............ 1/1 |
| 7,565,367 | B2 * | 7/2009 | Barrett et al. ........... 1/1 |
| 7,580,926 | B2 * | 8/2009 | Kapur et al. ............ 1/1 |
| 7,657,526 | B2 * | 2/2010 | Aravamudan et al. ...... 707/750 |
| 7,668,821 | B1 * | 2/2010 | Donsbach et al. ........ 705/27 |
| 7,818,194 | B2 * | 10/2010 | Yoshida et al. .......... 705/7.32 |
| 7,970,753 | B2 * | 6/2011 | Oral et al. ............. 707/711 |
| 8,326,841 | B2 * | 12/2012 | Ott et al. .............. 707/748 |
| 2007/0203747 | A1 * | 8/2007 | Baharloo et al. ......... 705/2 |
| 2007/0219955 | A1 * | 9/2007 | Li et al. ............... 707/3 |
| 2008/0120289 | A1 * | 5/2008 | Golan et al. ............ 707/5 |
| 2008/0183574 | A1 * | 7/2008 | Nash et al. ............. 705/14 |

\* cited by examiner

Primary Examiner — Robert Beausoliel, Jr.
Assistant Examiner — Noosha Arjomandi
(74) Attorney, Agent, or Firm — Sprinkle IP Law Group (57) ABSTRACT

Methods and systems for identifying products and product idea lists. A method is provided which includes searching a product index for a result. The result is used to search an idea list index for idea lists related to the result wherein each idea list includes at least one product and has an associated popularity and relevance to the search. The method also includes outputting at least some of the idea lists based on the popularity and relevance of the idea lists. In one embodiment a method of identifying product idea lists is provided. The method includes searching a product index for keywords associated with products in a product idea list. The method also includes using the keywords to search a product idea index for other idea lists and outputting the other idea lists based on their popularities. In some embodiments, the popularities may be based on time-weighted events.

20 Claims, 5 Drawing Sheets

PRODUCT DETAIL

Product Detail    back to search results | new search

SOURCING
216 — Product Search
218 — Most Popular Products
220 — Sourcing Admin
222 — My Ideas
224 — Team Ideas RELATED IDEAS
226A — health initiative
226B — Wine Lovers
226C — farmers
226D — Soldier Car Package
226E — airline gifts RELATED PRODUCTS
EVEREST 20 CAN SUPER COOLER ($16.50)
ENCORE SPEAKER COOLER ($27.33)
COMMUTER MULTI-PURPOSE COOLER ($11.50)
EXCEL INSULATED DUFFEL PACK COOLER ($30.67)
EVEREST 9 CAN SUPER COOLER ($13.17)

MORE FROM LEEDS
MONTSERRAT 12 CAN SUPER COOLER ($19.00)
EVEREST 30 CAN SUPER COOLER ($19.83)
EXCEL SPORT BRIEF ($5.33)
CONNECTIONS DELUXE PICNIC COOLER ($49.83)
EXCURSION 12 CAN BEACH COOLER WITH DRAWSTRING TOP ($19.83)

MY RECENTLY VIEWED

FRESCO 20 CAN SPORT COOLER
Supplier # 430040 | Boundless ID # BN5197
Leeds | Supplier Product Page
Colors: ROYAL BLUE, BLACK ACCENT
[Add to Idea]

PRODUCT IDEA SHARING ALGORITHM

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD OF THE INVENTION

Embodiments of the disclosure relate generally to the field of selling products and more particularly to systems and methods for sharing product ideas among sales people.

BACKGROUND

Often when selling products to consumers, the consumers may allow, or even desire, that the sales person suggest ideas for products that the consumer might want to include in a purchase. In some embodiments, many organizations such as companies, schools, teams, fraternal organizations, etc. desire to purchase "promotional" products which may include the organization's motto, symbol, or other logo on the product. Many times, the organization will want to purchase not just one, but several, products to distribute to the members of the organization or, in some embodiments, to sell. The person responsible for the purchase may therefore have an idea of what they might want to purchase or perhaps a theme for the purchase. But that person may have trouble coming up with ideas for the purchase. In the alternative, a buyer may not have any particular ideas regarding the purchase and may wish to be guided through the selection process.

Additionally, within the sales department of a products merchant, many suggestions for purchases may be generated in isolation by the individual sales people. Sometimes, a particular suggestion made by a particular sales person will generate one, or more, large orders. Other sales people within the sales department may be unaware of such success. If they were aware of such a success they would probably enjoy sharing in it by guiding other purchasers toward similar ideas.

SUMMARY OF THE INVENTION

Embodiments of the present disclosure provide systems and methods for selling products that eliminate, or at least substantially reduce, the shortcomings of prior art systems and methods for selling products. Since purchasers often desire to have some guidance in their purchases and since sales people often generate product ideas in isolation from one and other, systems and methods for sharing product ideas are provided.

In some embodiments, products (such as those in a catalogue) can be added to personal "idea lists" by an end-user. Idea lists can be, in some embodiments, user-selected groupings of products. The idea lists may have some perceived theme and a corresponding title. Products and idea lists can have a set of indexed attributes, such as keywords, themes, and other information pertaining to the products or idea lists. For idea lists, the indexed attributes may be a weighted set of the indexed attributes of all of the products within the idea list. Idea lists may also have a popularity score, which can be expressed in points.

Points may be issued to idea lists when they are viewed or acted upon by, in some embodiments, any user other than the owner of the list. The points issued can be proportionate to how significant the event may be viewed by the merchant, the idea list owner, or others. The viewing of an idea list may result in the issuance of 3 points. If the user copies a product from the list into one of the user's own lists, in some embodiments, then 20 points may be issued to the originating idea list. In some embodiments, the first sale of a product might be awarded 300 points. The viewing of a list identified in a product search and presented third in a list of search results ordered by relevance may result in the issuance of more points than if the list had been listed first in relevance. One reason that this might be the case is that since users have a tendency to view the first result returned by a search, a user who skips over more highly ranked results indicates that the viewed result might contain some interesting ideas. Points associated with a popularity score can have a rate of decay (expressed in some embodiments as a percentage per day) which may serve to keep the popularity score relevant over time. Idea lists may be presented based on a combination of search relevance and popularity.

In some embodiments, when product search results are displayed, an object on the screen may display a number N of "related idea lists." This list of related idea lists can include any number N of idea lists depending, in some embodiments, on how many idea lists the search returns. In one embodiment, about one half of the most relevant idea lists from the overall set of returned idea lists is displayed although any fraction of the returned lists could be displayed. The relevance to the product search of the returned idea lists may be determined by searching the indexed attributes of the products returned by the search and comparing those attributes against the indexed attributes of the idea lists. The most popular lists can be sorted and displayed according to their popularity, their relevance to a search, or by a combination of both. Collaborative sharing of lists that are both relevant and popular may be enhanced by some embodiments. Popular and relevant idea lists may also propagate throughout the merchant's system(s) in some embodiments.

Embodiments also provide methods in which each idea list includes at least one product and has an associated popularity. In one embodiment, the method includes searching a product index for a result; using the result to search an idea list index for idea lists which are related to the result; and outputting at least some of the idea lists based on the popularity of the idea lists. The popularity of the idea lists can be modified if, in some embodiments, the idea list is viewed, a product from it is copied to another idea list, or a product from it is bought. In some embodiments, the popularity may take the form of a score in which points are added when events such as those listed above occur. The points can be time-weighted so that as events recede into the past, their influence on the popularity of the idea lists wanes. Idea lists can also be created based on the activities of a person such as, in some embodiments, the person's searching, browsing, or buying habits. A list of products may also be output based on the search of the product index.

The disclosure also provides methods to identify idea lists which might be related to another, given idea list. In one embodiment, a method includes searching a product index for keywords associated with the products in the idea list; using the keywords to search a product idea index for other idea lists; and outputting the other idea lists based on their popularities. Systems for performing such methods are also provided in other embodiments.

Purchasers of products identified in accordance with embodiments of the disclosure may therefore enjoy better, more insightful, and productive guidance from the sales people who guide them in their purchase decisions. Embodiments of the disclosure also allow sales people to generate greater sales volume and profit while reducing the amount of time and effort they expend providing guidance to purchasers. The sales people may also appear to be more innovative in their product selections because, in some embodiments, they learned of product ideas in accordance with embodiments of the disclosure. Product merchants operating in accordance with embodiments of the disclosure may enjoy greater margins, profitability, and cash flow.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

Preferred embodiments of the disclosure are illustrated in the FIGURES, like numerals being used to refer to like and corresponding parts of the various drawings. Embodiments of the disclosure provide systems and methods for sharing product ideas among sales people.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, ratio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. In some embodiments, a process, process, article, or apparatus that comprises a first of elements is not necessarily limited only those elements but may include other elements not expressly listed or inherent to such process, process, article, or apparatus. Further, unless expressly stated to the contrary, "or" refers to an inclusive or and not to an exclusive or. In some embodiments, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Figure 1:
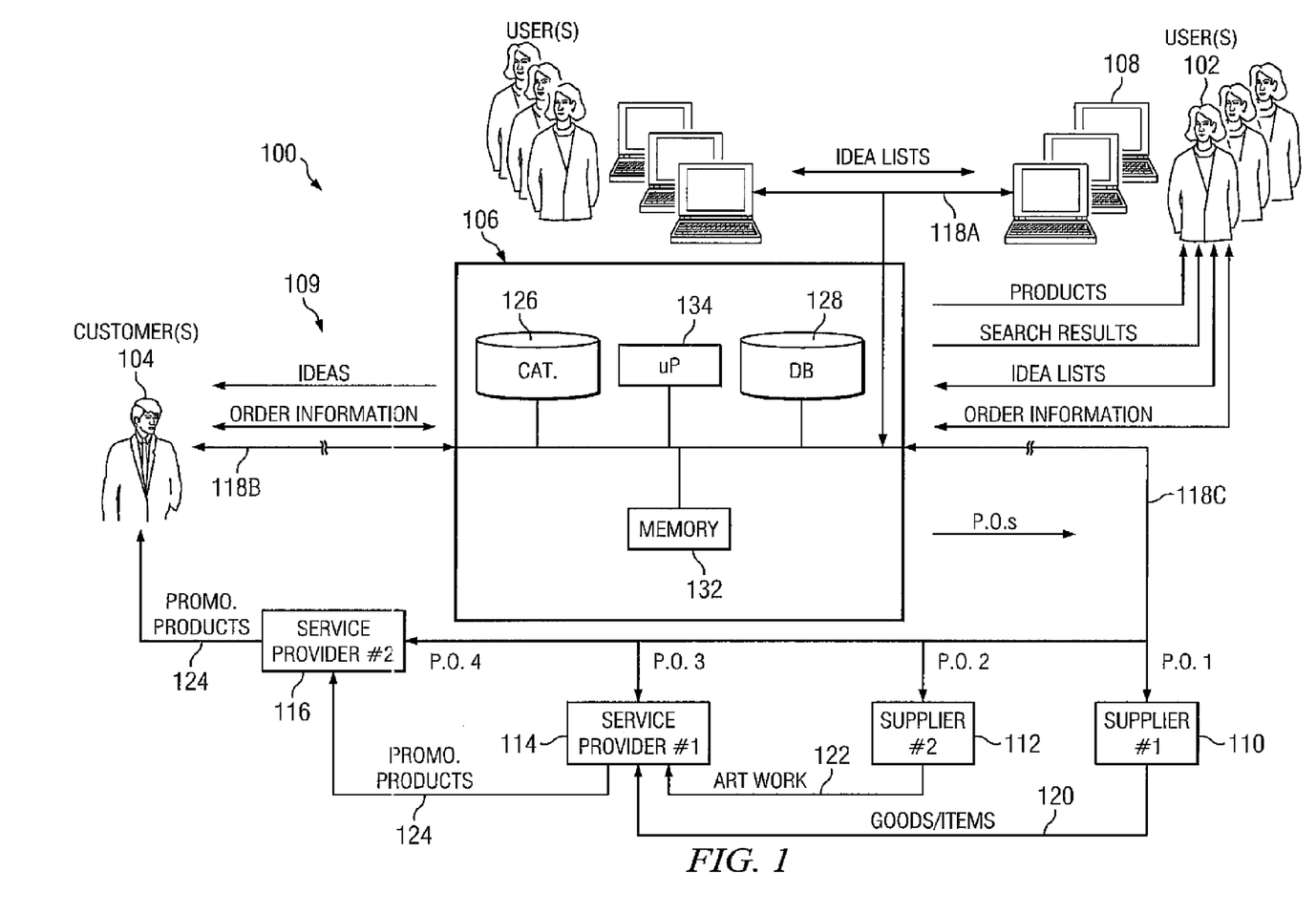
FIG. 1 illustrates a system constructed in accordance with an embodiment of the disclosure.

With reference now to FIG. 1, one embodiment of system 100 for sharing product ideas is illustrated. System 100 may be employed by users 102 to take orders for promotional products from customers 104. System 100 typically includes a computer 106 and interfaces 108 and 109 for users 102 and customers 104, respectively. System 100 further includes one or more suppliers 110 and 112 and service providers 114 and 116. FIG. 1 also shows network 118 (the Internet or another electronic communications network in some embodiments) which may be utilized to provide the interfaces for users 102, customers 104 and suppliers 110, 112, 114, and 116.

Generally, system 100 may be utilized so that user 102 may arrange for items 120 selected by customer 104 to be shipped to service provider 114 so that artwork 122 (also selected by customer 104 in some embodiments) may be added to item 120. In some embodiments, the resulting promotional products 124 (or decorated item 120 in some embodiments) may then be shipped to another service provider 116 where additional services may be performed on promotional products 124. Once these subsequent services, if any, have been performed, system 100 allows finished promotional products 124 to be shipped to customer 104.

As FIG. 1 shows that computer 106 may include catalogue 126, idea list database 128, memory 132, and processor 134. Memory 132 can be used to store catalogue 126, idea list database 128, and the software instructions which operate the computer 106 or which perform other functions associated with system 100. However, catalogue 126 and idea list database 128 could be combined and could be located in another computer or a remote storage facility that communicates with computer 106. Thus, other system configurations are possible and fall within the scope of the disclosure. Interface 109 allows customers 104 to make item selections from catalogue 126 and to send artwork to system 100. Network portion 118C interfaces with suppliers 110, 112, 114, and 116 and can allow purchase orders, artwork, and "exceptions" or special instructions to be transmitted to suppliers 110, 112, 114, and 116.

At interface 108, information may flow to, and from, users 102 as depicted. More particularly, system 100 may operate to display the selections of customers 104 to users 102 who may be assisting customers 104 with purchases. Additionally, interface 108 may display information regarding orders, products, product searches, and idea lists for users 102. Similarly, interface 109 can display information from catalogue 126, sales orders, invoices, and ideas from users 102 for customers 104. Thus, information concerning an order generally flows from customer 104 to user 102 (a sales person in some embodiments) and then to suppliers 110, 112, 114, and 116 with feedback to customer 104 in the form of invoices, bills, sales acknowledgements, etc. Information regarding product ideas and idea lists may also flow between users 102 and customers 104.

In any event, information in system 100 may be made available to users 102, customers 104, and processor 134 on an appropriately selective basis. Generally, and still with reference to FIG. 1, customer 104 may view catalogue 126 and make selections of items (including indicating the desired quantities of the items) which customer 104 wishes to order. User 102 may review the transaction and assist customer 104 with product selections via interface 108. Thereafter, system 100 can issue purchase orders P.O.s 1-4 (purchase orders can be documents authorizing a seller to ship goods or provide services) to appropriate suppliers 110, 112, 114, and 116 as illustrated by FIG. 1. Additionally, system 100 may generate sales acknowledgments, sales orders, and bills or invoices for customer 104. Usually, system 100 will generate several purchase orders P.O.s 1-4 but only one sales order for a given customer selection. Indeed, it has been found that system 100 may be advantageously used to drop-ship promotional products 124 and other goods to various customers 104.

Consider the case in which embroidered pieces of artwork 122 (a company logo in some embodiments) are to be added to a quantity of goods 120 (shirts in some embodiments). Customer 104 makes a selection at interface 109. Once verification of the order is received from customer 104, the appropriate purchase orders P.O.s 1-4 may be sent as illustrated in FIG. 1. Here P.O. 1 is sent to shirt supplier 110 while P.O. 2 is sent to embroidery supplier 112 as is the artwork chosen by customer 104. Artwork 122 can be an electronic file; can be stored in system 100; or can be a physical sample provided by customer 104 (via mail, hand delivery, or other delivery service). Both suppliers 110 and 112 ship their respective goods 120 and 122 (when ready) to first service provider 114 (an embroiderer in some embodiments). In turn, embroiderer 114 adds embroidered artwork 122 to blank shirt 120 to create promotional shirt 124 in accordance with P.O. 3. In the case shown, customer 104 has also selected that a subsequent service be performed on promotional products 124. In some embodiments, customer 104 might want promotional product 124 gift wrapped or added to a kit. Thus, P.O. 4 indicates to gift wrapper or kitter 116 to perform the appropriate service with promotional shirt 124.

With regard to idea list database 128, database 128 can contain historical data regarding past customer selections, purchase orders, sales orders, shipment plans, and supply chains. Idea list database 128 may also contain data related to items 120, artwork 122, techniques to add artwork to various items 120, suppliers 110 and 112, service providers 114 and 116, and items 120 and techniques that suppliers and providers provide, etc. Idea list database 128 may also contain idea lists created by users 102 and information relating to the popularity of products 124 and to the popularity of the idea lists. Additionally, database 126 may include a product index and an idea list index wherein keywords associated with products 124 and idea lists are indexed to facilitate searching for products 124 and idea lists.

If, at any time, user 102 desires assistance in identifying products in catalogue 126 which customer 104 might be interested in, user 102 can use idea list database 128. In some embodiments, user 102 can enter a keyword search for a product in catalogue 126 via interface 108. System 100, in some embodiments could then return a list of relevant products and a list of relevant idea lists. Some of the relevant idea lists could have been identified by, in some embodiments, use of the idea list index. In some embodiments, system 100 can also be configured to identify the keywords associated with all products 124 in an idea list and search for other idea lists based on, in some embodiments, the accumulated keyword counts for each identified product related keyword.

Figure 2:
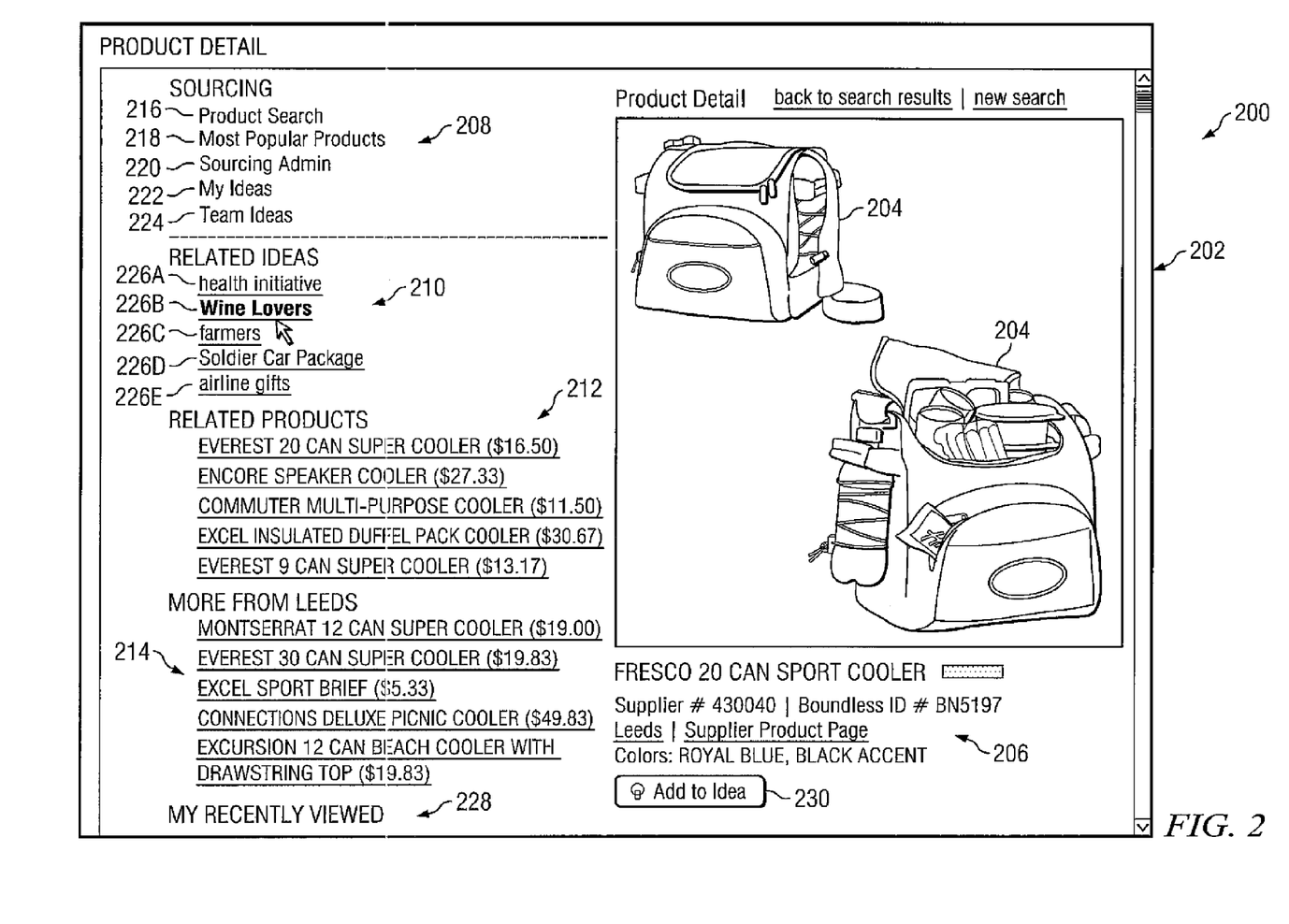
FIGS. 2-4 depict screenshots of a graphic user interface (GUI) of an embodiment of the disclosure.
Figure 3:
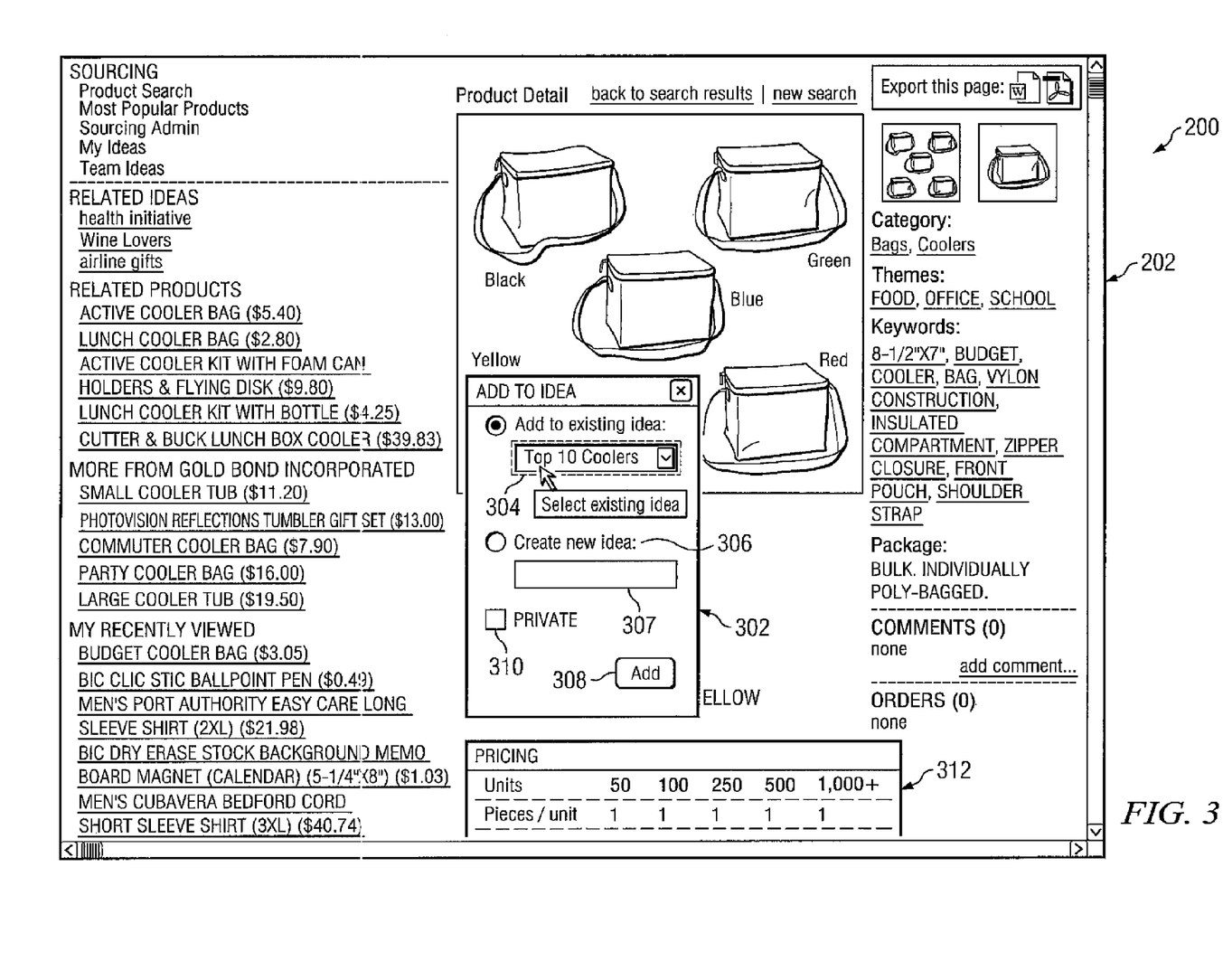
Figure 4:
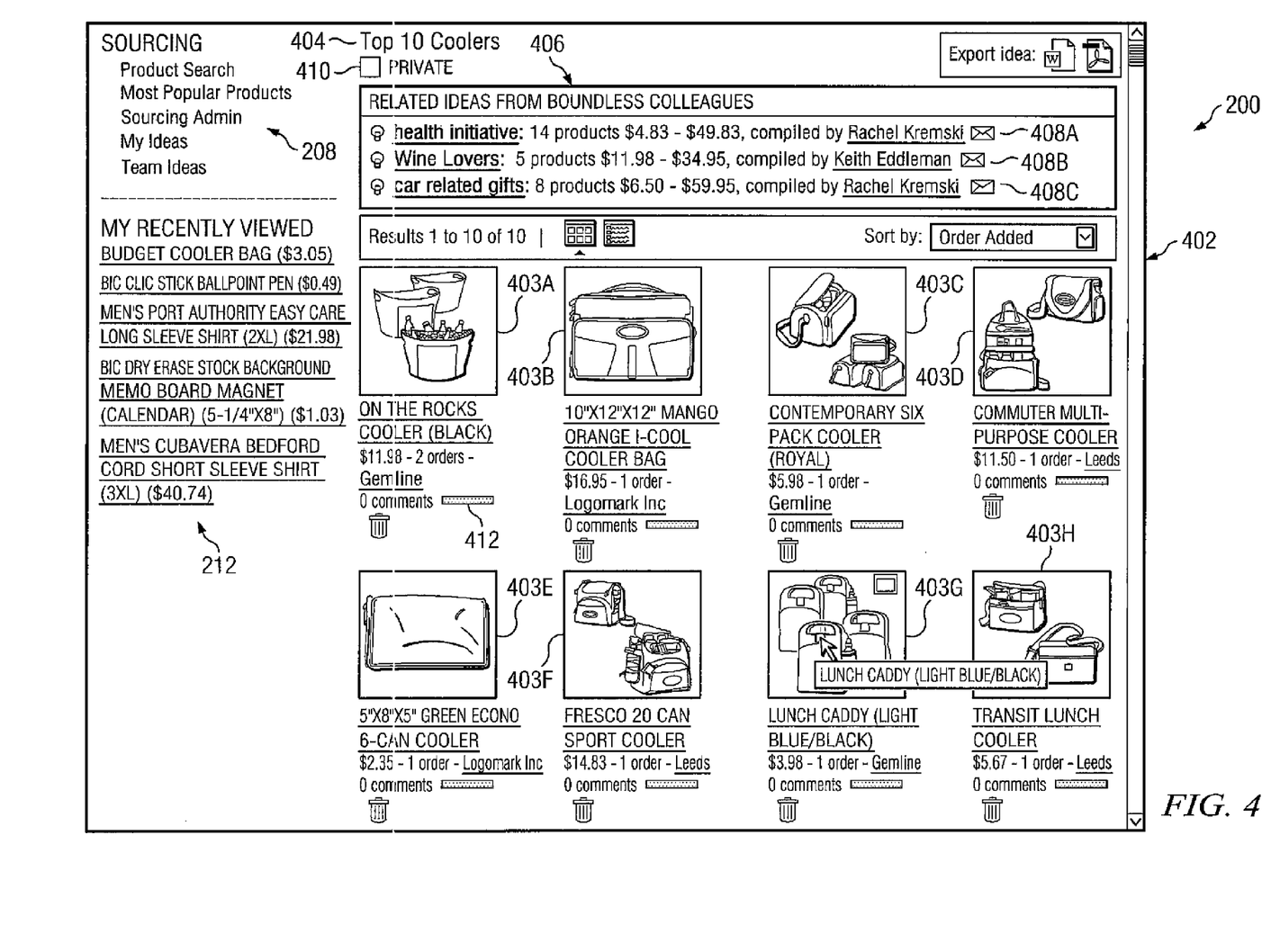

With reference now to graphical user interface (GUI) 200 of FIGS. 2-4, some embodiments include GUI 200 to facilitate the sharing of idea lists among users 102 of FIG. 1. FIG. 2 illustrates product detail window 202 of GUI 200 of some embodiments. Product detail window 202 shows product 204 (a cooler in some embodiments) which may correspond to product 124, identifying information 206 regarding product 204, and several informational areas 208, 210, 212, and 214. Informational areas 208, 210, 212, and 214 may serve many purposes such as providing user 102 a source of potential ideas for products other than product 204 but in some manner related thereto. In some embodiments, sourcing area 208 can provide a product search capability 216, a capability to access the most popular products 218 in catalogue 126, and administrative controls 220 for user configuration of other items 216, 218, 222, and 224 in GUI 200. Sourcing area 208 may also allow user 102 access to the user's idea lists as well as those of members of teams of which user 102 may be a part (via controls 222 and 224 respectively). The other team members can be, but need not be, other members of the sales department. In some embodiments, the team members or the creators of the idea lists (available via control 224) could be personnel from supervision, management, marketing, etc.

Informational area 210 provides user 102 access to a number of idea lists 226 that may be in some manner related to the product 204 (a cooler in some embodiments). Idea lists 226 may be generated by system 100, in some embodiments, by identifying the keywords associated with product 204 in the product keyword index and by searching for idea lists 226 in the idea list index (using the keywords associated with product 204). In some embodiments, idea list 226B, which may be titled "Wine Lovers," could be related to cooler 204 in the indexes by way of keywords such as "picnic" or "drinks" which appear in the index entry for product 204 and which appear in the index entry for idea list 226B.

Informational area 212 can include products similar to product 204. Here, in some embodiments, FIG. 2 shows several other coolers in related products area 212. Informational area 214 provides user 102 a list of products from the same manufacturer as product 204 although other attributes of product 204 (product category or position in a catalogue in some embodiments) could be used as a basis for area 214. Idea list database 126 of FIG. 1 can contain information linking the products listed in related products area 212 and manufacturer area 214 to displayed product 204. In some embodiments, related products area 212 displays products with the highest relevance to product 204 as determined by a comparison of the keywords for product 204 with the keywords for other products in the product index. Product detail window 202 may also provide user 102 a control 228 to re-visit products 204, idea lists 226, and the like which user 102 may have recently viewed. Each informational area 208, 210, 212, and 214 (and other information displayed by GUI 200) may allow a user 102 to brainstorm, free associate, or follow leads to ideas for products to suggest to customer 104 for purchase.

Product detail 202 can also allow user 102 to add products 204 to idea lists 226 via a button 230 or other control. When user 102 selects control 230 to add a product 204 to an idea list, system 100 may display window 302 of FIG. 3 to do so. Idea list addition window 302 may be a dialogue box or the like which can include further controls 304, 306, and 308. Control 304 may be a drop down list or other control which allows user 102 to select or specify the idea list to which user 102 desires to add product 204. Idea list addition window 302 may also include controls 306 and 307 which allow user 102 to create a new idea list should user 102 desire to do so. A control such as button 308 may also be provided to allow user 102 to indicate to system 100 to add product 204 to an idea list or to create an idea list and add product 204 to it (as may be the case). Idea list addition window 302 may also include a control 310 such as a check box or radio button to allow user 102 to keep the idea list as private information. GUI 200 may also display potentially relevant information in other words 312. In some embodiments, window 312 could display information regarding pricing, availability, delivery options, etc.

FIG. 4 illustrates idea list window 402. System 100 may display idea list window 402 when user 102 selects one of the idea lists 226 presented in window 202 of FIG. 2. Idea list window 402 includes products 403 included in idea list 404 by the creator or current owner of idea list 404. Products 403 could be any product in the catalogue 126. Idea list window 402 may also include a list 406 of idea lists 408 related to idea list 404 via keywords in the product and idea list indexes. System 100 of FIG. 1 may generate related idea list 406 by agglomerating the keyword weights of each product 403 in idea list 404. Using the agglomerated keyword weights, system 100 can search the idea list index for idea lists which at least partially match the agglomerated keywords and present the results in related idea list 406. Idea list window 402 may also include a control 410 which can allow user 102 to keep information related to idea list 404 private.

Table 1 illustrates a product index of some embodiments.

TABLE 1

Product Index

| Products | Attribute Keywords |
| --- | --- |
| 1 | baseball cap |
| 2 | T-shirt |
| 3 | coffee cup |
| 4 | beer mug |
| 5 | key chain |
| 6 | camping tent; sleep; campground; camping out; canoe trip |
| 7 | canoe seat cushion, canoe trip; camping trip |
| 8 | cooler |
| 9 | camping stove, camp fire |

In Table 1, the keywords may be normalized so that all variations of the word "camp" will count towards an occurrence of the term "camping" or vice versa. The keywords in Table 1 may be chosen to reflect any number of attributes of the products listed therein. In some embodiments, the type of product may be one keyword. Another keyword could describe the product's use, nation of manufacture, design, environment of use, a hobby, theme, or activity associated with the product, etc.

Figure 5:
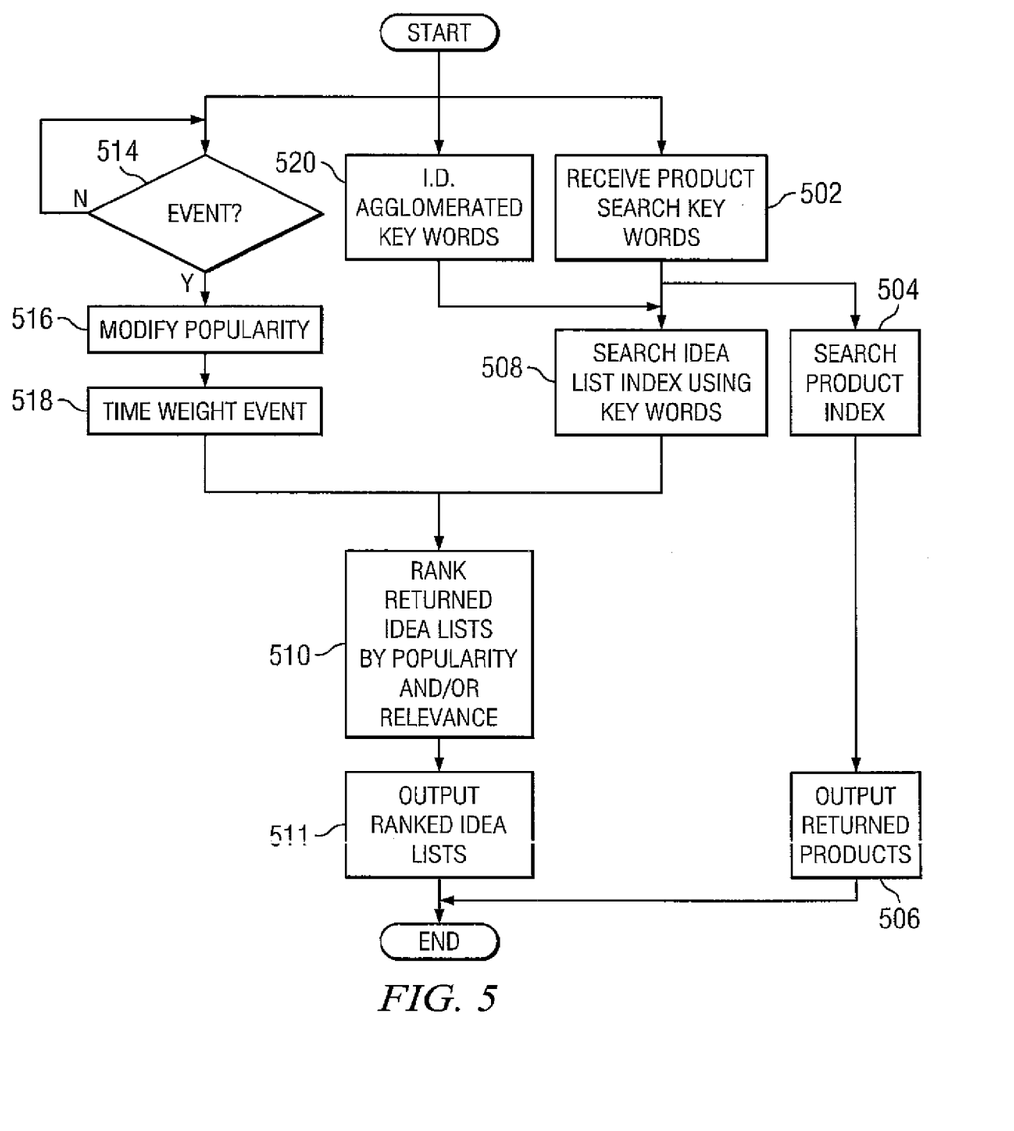
FIG. 5 is a flowchart illustrating a method practiced in accordance with an embodiment of the disclosure.

With reference now to FIG. 5, a method 500 of sharing idea lists in accordance with some embodiments is illustrated. Method 500 can base an idea list search on a product search. In some embodiments at step 502 system 100 can receive the keywords associated with a product search. System 100 can use the keywords to search the product index in database 126 for relevant entries at step 504. Such a product index search might produce a result as shown in Table 2.

TABLE 2

Product Index Search Results

| Keywords | Results (Product #s:Weights) |
| --- | --- |
| Camping | 6:3, 7:1, 9:2 |
| Canoeing | 6:1, 7:2 |

As Table 2 shows, the search of the product index might find three products (corresponding to product numbers 6, 7, and 9 in some embodiments) with various weightings. The weightings of the products 6, 7, and 9 could correspond to the number of times the keywords associated with products 6, 7, and 9 included the keywords of the search. Table 1 shows that in some embodiments product number 6 has three occurrences of the term "camp" in its product keyword list and has one occurrence of the term "canoe." Product 6 could be, in some embodiments, a tent. In Table 1, product number 7 has one occurrence of the term "camp" and two occurrences of the term "canoe" in its product keyword list. Product 7 could be a life vest. Product 9 of Table 1 has two occurrences of the term "camp" and no occurrences of the term "canoe" in its product keyword list. Product 9 could be a camping stove in some embodiments. In some embodiments, system 100 can have the capability to conduct logical "and" searches as well as logical "or" searches. If system 100 conducts an "or" search, all products 6, 7, and 9 meeting either search term (camp or canoe) could be output at step 506. If system 100 conducts an "and" search, only those products 6 and 7 meeting both search terms could be output at step 506.

Method 500 may also include, in some embodiments, using the keywords for a product search to conduct an idea list search in parallel with, in series with, or in lieu of the product search. In some embodiments, at step 508, system 100 could conduct the idea list search in parallel with the product search of step 504. In conducting the idea list search, system 100 can examine (for each idea list being searched) all of the keywords for the products in the idea list and combine the weightings to produce a result for the idea list. The idea list search may have a result similar to the result illustrated by Table 3 where idea list 5 can have a combined weight for the term "camp" of 4. Idea list 5 could have two products with the term "camp" as a keyword. One of these products may list "camp" 3 times and the other product may list "camp" once. In Table 3, the results show that idea list number 5 has the highest weight at a combined weighting of "5" (including the four occurrences of the term "camp" and one occurrence of the term "canoe") for a logical "or" search. A ranked listing (by relevance) of the results could place idea list 5 as the most relevant idea list, with idea list 1 in an intermediate position, and idea list 8 being last.

TABLE 3

Product Index Search Results

| Keywords | Results (Idea List #s:Weights) |
|---|---|
| Camp | 1:2, 5:4; 8:1 |
| Canoe | 1:1, 5:1 |

In some embodiments, method 500 ranks the returned idea lists by popularity and relevance to a product search (such as the search of Step 502) at step 510. In some embodiments, method 500 ranks the returned idea lists by either relevance or popularity at Step 510. The popularity rankings can be based on a portion of method 500 as shown at steps 514, 516, and 518. At step 514, system 100 can monitor the various idea lists to determine whether certain events that might bear on the idea list's value to users 102 occur. These events can include, in some embodiments, a user 102 viewing the idea list, selecting a product in the idea list, copying a product from the idea list into another idea list, quoting a product from the idea list to a custom 104, or ordering a product from the idea list. Each of these events, and others, can be assigned a number of popularity points corresponding to the perceived value of the events at step 516. These points may be added to a popularity score associated with the affected idea list.

At step 518, in some embodiments, the assigned popularity points may be time-weighted. In some embodiments, time-weighting points may cause the points to decay over time such that a given event only influences a popularity score for some user selected time. In one embodiment, the assigned points are multiplied by a constant fractional value (0.985 in some embodiments) each day, week, month, or other unit of time. In another embodiment, a user selected half-life is chosen so that system 100 causes the points to decay to half of their value in a selected time frame. In some embodiments, a half-life of about 2 months can be selected. For some embodiments, time-weighting the points allows a product's popularity to reflect seasonal changes in the behavior of users 102 and of customers 104. At step 510, system 100 can examine the popularity of each of the idea lists returned at step 508 and rank the lists accordingly. In one embodiment, the entire list of returned idea lists can be output at step 511. In some embodiments, only a predetermined fraction of the total number of returned idea lists is output for display to the user, storage database 128, or other locations. In some embodiments, the most popular half of the idea lists could be output at step 511.

Various events occurring in system 100 can trigger adjustments to the popularity scores associated with products 403 or idea lists 404. Such storable events can be first class persistable entities. The events can have an associated userid (of the user involved in the event in some embodiments), an event type, a date, base points B, and a resulting score. Each product 403 can have a collection of events representing all events which contributed to the product's score within some selected time. In some embodiments, popularity affecting events can include:

New product added to system (base score B=50):
When a new product 403 is added to system 100, an initial popularity score may be assigned to product 403. In some embodiments, the initial popularity score is a non-zero number such as 50.

List viewed from related ideas area 406 (base score B=5):
When idea list 408C (in some embodiments) is viewed from a related ideas area 406, idea list 408C may receive points equal to B+Position where "Position" can be the position of the idea list 408C on the related ideas area 406 (top of list=1, third on list=3, etc. in some embodiments). In some embodiments, idea lists 408C positioned later in the related idea area 406 than idea lists 408A and 408B (in some embodiments) can be awarded more points. This scoring mechanism can apply to the idea lists 408 in the related ideas area 406, search results pages, product detail windows 202, etc.

List viewed via team ideas control 224 (base score B=2):
When a list 408 is viewed via team ideas control 224 it may receive B points.

Product copied to personal idea list (base score B=20):
When a user 102 copies product 403 from another user's idea list (copying product 403 over to another user's personal idea lists in some embodiments) the source list 404 may receive B points.

Product viewed from idea list (base score B=1):
When a user clicks on a product 403 from an idea list 404 (in some embodiments) not belonging to them, idea list 404 which contains product 403 may receive B points.

Product viewed from search results page (base score B=2):
When product 403 is viewed from a search results page (which may have been generated by a user 102 initiated search) product 403 may receive a number of points equal to B+the lower of 4 or "resultsPage" where "resultsPage" is the page index of the search results (on which of several product search results pages product 403 appeared in some embodiments). Products 403 shown on later pages in search results but still viewed by users 102 may be awarded more points than products 403 which are listed earlier. If, in some embodiments, product 403 was listed on the third search results page, it would be awarded 20 points plus some minimum number of points such as 3 or 4 (here 3 points for the third position) for a resulting total of 23 points.

Product exported (base score B=20):
When product 403 is exported from a product detail 202 page to (in some embodiments) an idea list 404, base points B may be awarded to product 403.

Product added to idea list (base score B=20):
When product 403 is added to a user's idea list, base points B may be awarded. This can apply to copy actions too.

Product viewed from another user's idea list (base score B=10):
When user 102 views product 403, which is in another user's idea list 404, base points B may be awarded to idea list 404.

New product sale (base score B=50):
When system 100 detects a new sale of product, base points B may be multiplied by certain factors such as the following:
Number of times that user 102 has sold that product 403 in the last 6 months (inclusive of current sale) of [1, 2, 3, 4 . . . ]-→[1×, 3×, 2×, 0.1× . . . ]
Number of times that customer 104 has bought that product 403 in the last 6 months (inclusive of current sale) of [1, 2, 3, 4 . . . ]-→[1×, 3×, 2×, 0.1× . . . ]

Multipliers, such as those listed above, may treat each additional purchase differently. In some embodiments, a multiplier could increase over the course of the first several purchases and then diminish rapidly over the course of subsequent purchases. In some embodiments, multipliers can be added together, then multiplied by the base score. The resulting points can then be added to the product's score. The multipliers, as with other values, should be configurable by, in some embodiments, a system administrator.

Suppose that user 102 has sold product 403 to customer 104. He has sold product 403 a total of two times in the past 6 months, including this time. In some embodiments, the first multiplier would be "3". In some embodiments, if customer 104 has never purchased product 403 prior to the current sale the second multiplier would be "1." The resulting multiplier could be "4" ((3+1). As a result, base points B of 50 are multiplied by 4 to arrive at a resulting score of 200 to be awarded to product 403. Suppose that user 102 has sold a given product 403 four or more times, and sells it to a customer 104 who has purchased product 403 four or more times. In some embodiments, the multiplier would be 0.1+0.1=0.2 and 0.2*B=10 points could be awarded to the product 403.

In some embodiments, an event can cause points to be added to (or subtracted from) a product 403 or idea list 404 if the user 102 who triggers the event has not triggered an event for that product 403 or idea list 404 resulting in more points than the current event. In some embodiments, these previous events (that might deny eligibility to subsequent events) may be time limited in effect. If a user previously triggered an event which awarded 10 points to a product, in some embodiments to be eligible to add or subtract points from that product's popularity, an event caused by that user 102 would have to result in more than 10 points (positive or negative) being added to that product's popularity. If, in some embodiments, the prior event were limited in its effect for a number of days (60 days in some embodiments) and that number of days had passed, then any event by the same user 102 would result in points being added to or subtracted from the relevant popularity score regardless of the number of points associated with the latter event.

In some embodiments, popularity scores can be applied to products 403 and can be a decimal number. The popularity score can be negative in some embodiments if, in some embodiments, a negative scoring event affects product 403. The scores for the products 403 may be displayed for user 102. In some embodiments a visual indicia 412 of the popularity of a product 403 may be displayed as shown by indicia 412 of FIG. 4. In some embodiments, indicia 412 represents the popularity of the product 403 relative to the universe of active products 403 in system 100 (of FIG. 1). Indicia 412 could indicate the percentile of products 403 which a particular product out scores. In some embodiments, indicia 412 has a selected number of discrete states, each indicating a range of popularity rankings. Indicia 412 could have 10 states corresponding to the 0-10, 10-20, 20-30 . . . to the 90-100 percentile rankings. In some embodiments, the percentile groupings can correspond to natural language (English in some embodiments) descriptions such as:

"This product is extremely popular." (for 90-100%),
"This product is very popular." (for 75-90%),
"This product is popular." (for 60-75%),
"This product has average popularity." (for 40-60%),
"This product has below average popularity." (for 10-40%), and
"This product is not popular." (for 0-10%).

In FIG. 4, indicia 412 may be a horizontal bar and may have a length dependent on the percentile score. Other indicia (a circular object in which the brightness or color of the fill indicates the popularity of product 403 in some embodiments) are within the scope of the disclosure. At selected intervals (every night in some embodiments), the popularity scores for the active products could be re-computed, the products re-ranked, and a histogram constructed showing the number of products 403 in each percentile range. In some embodiments, the absolute popularity scores are periodically converted to percentiles scores.

In some embodiments, an estimated percentile ranking can be created. In some embodiments, a sampling of the absolute popularity rankings could be converted to percentiles. This sampling of percentile scores could then be used to place the remaining, unsampled products in to their respective estimated percentile groups. In some embodiments, suppose that there were 100 active products 403 in system 100. System 100 could select eleven products at random and convert their popularity scores to percentile rankings. This list of eleven product scores could be ranked such that the eleven percentile rankings define the boundaries of the ten percentile ranges (including the outer boundaries of the $0^{th}$ and $100^{th}$ percentile rankings). The absolute popularity scores of the remaining 90 products 403 could then be compared to the absolute popularity scores of the eleven boundary products 403. The system 100 can then group the remaining products according to which boundary products 403 each remaining product 403 lies between. In some embodiments, if two products 403 with absolute popularity scores of 0 and 1 define the 0-10 percentile group, and if one of the remaining products 403 has an absolute score of 0.5, system 100 can group that product in to the 0-10 percentile group. In some embodiments, 21 products are sampled resulting in 20 percentile groupings of 5% each.

If one of the remaining products has an absolute popularity score outside of the range of the sampled products 403, system 100 can adjust the boundaries of the percentile groupings accordingly. In some embodiments, suppose that one of the remaining products has an absolute popularity score of −1, system 100 can set the boundary for the lowest percentile group to −1 and re-compute the remaining 10 boundaries. In some embodiments, it could be that the new boundaries for the 0-10 percentile group would lie at −1 and 1. If one of the remaining products has a score of 0, system 100 would place the product in the 0-10 percentile group. System 100 could also extrapolate the product's percentile popularity by using the boundary values and the absolute score of the product. In some embodiments, system 100 would extrapolate the product's relative popularity to be about 5% (since its absolute score lies halfway between the absolute scores of the boundary products).

In some embodiments, the scoring methods described herein can be applied to any relevance or popularity based comparisons. Products 403, idea lists 404, proposals, key words, product categories, comments, users, etc. can be scored in some embodiments. A common scoring algorithm and user interface could be generated and applied to each of these applications.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the following claims and their legal equivalents.

What is claimed is:

1. A method of identifying products, the method comprising:
on a product idea sharing system comprising a database stored on a non-transitory medium and coupled to a processor configured to execute a set of instructions, the product idea sharing system further coupled to a network:
storing a plurality of idea lists in an idea list index in the database, wherein each idea list includes a plurality of products;
receiving a search request from a first user computing device via the network;

searching a product index stored in the database for a result based on the search request;

returning a list of relevant products to the first user computing device;

searching the idea list index using the result of the product index search for idea lists which are related to the result of the product index search;

selecting a set of idea lists from the idea list index, wherein each idea list in the set of selected idea lists has an associated popularity and has a relevance to the search request, wherein the set of selected idea lists includes a first idea list and a second idea list;

outputting the first idea list and the second idea list to the first user computing device, wherein the first idea list and the second idea list each include at least two product results, wherein each product result in the first idea list was selected based on a relevance to one or more other product results in the first idea list and each product result in the second idea list was selected based on a relevance to one or more other product results in the second idea list and wherein the first idea list is different from the second idea list;

issuing one or more points to each idea list that is acted upon by a customer, wherein the number of points issued to each idea list acted upon by the customer is based on the significance of the action;

updating a ranking of the first idea list or the second idea list based on the points associated with the first idea list or the second idea list;

updating the idea list index based on changes to the ranking of the first idea list or the second idea list;

receiving a search request from a second user computing device via the network;

searching the product index for a result based on the search request from the second user computing device;

returning to the second user computing device a list of relevant products associated with the search request received from the second user computing device; and searching the idea list index using the results of the product index search for idea lists which are related to the result of the product index search, wherein the returned idea lists include the idea list acted upon by the customer.

2. The method of claim 1, further comprising issuing, by the product idea sharing system, one or more points to the first idea list or the second idea list acted upon by the customer based on the ranking of the first idea list or the second idea list.

3. The method of claim 2, further comprising time-weighting, by the product idea sharing system, the action, wherein the ranking of the first idea list or the second idea list is based on the popularity of the first idea list or the second idea list.

4. The method of claim 2, wherein the action is selected from the group consisting of viewing the first idea list or the second idea list, copying a product in the first idea list or the second idea list to another idea list, and buying a product in the first idea list or the second idea list.

5. The method of claim 2, further comprising creating, by the product idea sharing system, a third idea list for the customer based on the activities of the customer.

6. The method of claim 2, wherein more points are issued, by the product idea sharing system, to one or more lower ranked idea lists acted upon by the customer.

7. The method of claim 1, wherein one or more of the first idea list and the second idea list are time-weighted for seasonal changes.

8. The method of claim 1, wherein the method further comprises the processor creating an idea list, wherein the idea list is created based on one or more of historical data and a consumer's activities.

9. The method of claim 1, wherein at least one idea list is created by the customer.

10. A method of identifying product idea lists, the method comprising:

on a product idea sharing system comprising a database stored on a non-transitory medium and coupled to a processor configured to execute a set of instructions, the product idea sharing system further coupled to a network:

storing a plurality of idea lists in an idea list index in the database, wherein each idea list includes a plurality of products;

receiving a search request from a first user computing device via the network;

searching a product index stored in a database for attributes associated with products in a first product list;

using the attributes associated with the products in the first product list to search an idea list index for a first idea list and a second idea list, wherein each product result in the first idea list was selected based on a relevance to one or more other product results in the first idea list and each product result in the second idea list was selected based on a relevance to one or more other product results in the second idea list, wherein each idea list has an associated popularity and has a relevance to the search, the first idea list being different from the second idea list;

outputting the first idea list and the second idea list to the first user computing device based on the popularities of the first idea list and the second idea list and relevance;

issuing one or more points to each idea list that is acted upon by a customer, wherein the number of points issued to each idea list acted upon by the customer is based on the significance of the action;

updating a ranking of the first idea list or the second idea list based on the points associated with the first idea list or the second idea list;

updating the idea list index based on changes to the ranking of the first idea list or the second idea list;

receiving a search request from a second user computing device via the network;

searching the product index for a result based on the search request from the second user computing device;

returning to the second user computing device a list of relevant products associated with the search request received from the second user computing device; and searching the idea list index using the results of the product index search for idea lists which are related to the result of the product index search, wherein the returned idea lists include the idea list acted upon by the customer.

11. The method of claim 10, wherein the attributes are represented by keywords.

12. A non-transitory computer-readable storage medium storing a database and computer-executable program instructions implementing a method of identifying product idea lists, wherein the computer-executable program instructions are executable to perform:

storing a plurality of idea lists in an idea list index in the database, wherein each idea list includes a plurality of products;

receiving a search request from a first user computing device via a network;

searching a product index for attributes associated with products in a product list;

using the attributes associated with the products in the product list to search an idea list index for a first idea list and a second idea list, wherein each of the first idea list and the second idea list has an associated popularity and has a relevance to the search;

outputting the first idea list and the second idea list to the first user computing device, wherein each product result in the first idea list was selected based on a relevance to one or more other product results in the first idea list and each product result in the second idea list was selected based on a relevance to one or more other products results in the second idea list, and wherein the first idea list is different from the second idea list;

issuing one or more points to each idea list that is acted upon by a customer, wherein the number of points issued to each idea list acted upon by the customer is based on the significance of the action;

updating a ranking of the first idea list or the second idea list based on the points associated with the first idea list or the second idea list;

updating the idea list index based on changes to the ranking of the first idea list or the second idea list;

receiving a search request from a second user computing device via the network;

searching the product index for a result based on the search request from the second user computing device;

returning to the second user computing device a list of relevant products associated with the search request received from the second user computing device; and searching the idea list index using the results of the product index search for idea lists which are related to the result of the product index search, wherein the returned idea lists include the idea list acted upon by the customer.

13. A non-transitory computer-readable storage medium storing a database and computer-executable program instructions implementing a method of identifying products, wherein the computer-executable program instructions are executable to perform:

storing a plurality of idea lists in an idea list index in the database, wherein each idea list includes a plurality of products;

searching a product index for a product in response to a request from a first user computing device via a network;

searching an idea list index using the result of the product index search for a first idea list and a second idea list, the first idea list and the second idea being related to the result of the product index search wherein each idea list has an associated popularity and has a relevance to the search;

outputting the first idea list and the second idea list to the first user computing device, wherein each product result in the first idea list was selected based on a relevance to one or more other products results in the first idea list and each product result in the second idea list was selected based on a relevance to one or more other products results in the second idea list, wherein the outputting is based on the popularity and relevance of the idea lists and wherein the first idea list is different from the second idea list;

issuing one or more points to an each idea list that is acted upon by a customer, wherein the number of points issued to each idea list acted upon by the customer is based on the significance of the action;

updating a ranking of the first idea list or the second idea list based on the points associated with the first idea list or the second idea list; and updating the idea list index based on changes to the ranking of the first idea list or the second idea list;

receiving a search request from a second user computing device via the network;

searching the product index for a result based on the search request from the second user computing device;

returning to the second user computing device a list of relevant products associated with the search request received from the second user computing device; and searching the idea list index using the results of the product index search for idea lists which are related to the result of the product index search, wherein the returned idea lists include the idea list acted upon by the customer.

14. The non-transitory computer-readable storage medium of claim 13, wherein the computer-executable program instructions are executable to perform outputting a subset of the first idea list or the second idea list based on the popularity of the first idea list or the second idea list.

15. The non-transitory computer-readable storage medium of claim 13, wherein the computer-executable program instructions are executable to perform issuing one or more points to the idea list acted upon by the customer based on the ranking of the idea list acted upon by the customer.

16. The non-transitory computer-readable storage medium of claim 15, wherein the computer-executable program instructions are executable to perform time-weighting the action, wherein the ranking of the first idea list or the second idea list is updated based on the popularity of the first idea list or the second idea list.

17. The method of claim 16, wherein one or more of the first idea list and the second idea list are time-weighted for seasonal changes.

18. The non-transitory computer-readable storage medium of claim 15, wherein the action is selected from the group consisting of viewing the first idea list, copying a product result in the first idea list to the second idea list, and buying a product in the first idea list.

19. The non-transitory computer-readable storage medium of claim 15, wherein the computer-executable program instructions are executable to perform creating a third idea list based on the activities of a person the customer.

20. The non-transitory computer-readable storage medium of claim 13, wherein the computer-executable program instructions are executable to perform outputting a product list based on the product index search wherein more points are issued to one or more lower ranked idea lists acted upon by the customer.

* * * * *